United States Patent
Ohtomo

(10) Patent No.: US 11,667,200 B2
(45) Date of Patent: Jun. 6, 2023

(54) CONTROL DEVICE FOR VEHICLE AND VEHICLE

(71) Applicant: SUBARU CORPORATION, Tokyo (JP)

(72) Inventor: Yosuke Ohtomo, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 334 days.

(21) Appl. No.: 17/060,381

(22) Filed: Oct. 1, 2020

(65) Prior Publication Data
US 2021/0155098 A1    May 27, 2021

(30) Foreign Application Priority Data
Nov. 26, 2019    (JP) .............................. JP2019-212885

(51) Int. Cl.
*B60L 7/18*    (2006.01)
*B60T 7/10*    (2006.01)

(52) U.S. Cl.
CPC ................ *B60L 7/18* (2013.01); *B60T 7/102* (2013.01)

(58) Field of Classification Search
CPC .... B60L 7/18; B60L 2240/12; B60L 2240/16; B60L 2240/423; B60L 2250/24; B60L 2250/26; B60L 7/14; B60L 15/2009; B60L 7/10; B60T 7/102; B60T 1/10; B60T 7/085; B60T 13/586; B60T 7/10; B60W 30/18; B60W 30/18127; Y02T 10/72; Y02T 10/64; F16D 61/00
See application file for complete search history.

(56) References Cited

U.S. PATENT DOCUMENTS

| | | | | |
|---|---|---|---|---|
| 5,161,634 A * | 11/1992 | Ichihara | ............... | B60K 31/047 180/170 |
| 9,834,193 B2 * | 12/2017 | Komuro | .................. | B60K 6/48 |
| 10,124,796 B2 * | 11/2018 | Morita | ................. | B60W 10/06 |
| 10,144,416 B2 * | 12/2018 | Sato | ............... | B60W 30/18172 |
| 10,464,440 B2 * | 11/2019 | Suzuki | .................... | B60L 15/20 |
| 10,611,257 B2 * | 4/2020 | Moriya | .............. | B60W 30/192 |
| 10,974,601 B2 * | 4/2021 | Moriya | .................... | B60L 7/10 |
| 2004/0236483 A1 * | 11/2004 | Kimura | ................... | B60L 50/16 701/22 |

(Continued)

FOREIGN PATENT DOCUMENTS

JP    2015-104149 A    6/2015

*Primary Examiner* — Mussa A Shaawat
(74) *Attorney, Agent, or Firm* — McDermott Will & Emery LLP

(57) ABSTRACT

A control device for a vehicle includes an operation unit, an operation-unit sensor, a motor, and a driving force controller. The operation-unit sensor is configured to detect an operation-unit operation amount. The operation-unit operation amount is an amount of operation of the operation unit. The motor is capable of generating a negative driving force for decelerating the vehicle. The driving force controller is configured to cause the motor to drive a wheel of the vehicle with the negative driving force on a basis of the operation-unit operation amount, and to derive the negative driving force in accordance with an initial time change. The initial time change represents an amount of change in the operation-unit operation amount per unit time relative to an operation-unit operation amount at an initial position of the operation unit.

9 Claims, 12 Drawing Sheets

(56) References Cited

U.S. PATENT DOCUMENTS

| | | | | |
|---|---|---|---|---|
| 2006/0102394 A1* | 5/2006 | Oliver | ................ | B60W 10/184 |
| | | | | 180/65.265 |
| 2007/0080005 A1* | 4/2007 | Joe | ................ | B60W 20/40 |
| | | | | 180/65.245 |
| 2007/0272457 A1* | 11/2007 | Kodama | ................ | B60K 6/52 |
| | | | | 903/947 |
| 2008/0132378 A1* | 6/2008 | Bouchon | ................ | B60W 10/11 |
| | | | | 477/79 |
| 2008/0236912 A1* | 10/2008 | Ueoka | ................ | B60K 6/445 |
| | | | | 180/65.265 |
| 2010/0191435 A1* | 7/2010 | Okamura | ................ | B60L 15/2045 |
| | | | | 701/93 |
| 2011/0165992 A1* | 7/2011 | Ueno | ................ | B60K 6/365 |
| | | | | 180/65.265 |
| 2011/0174559 A1* | 7/2011 | Saito | ................ | B60W 30/19 |
| | | | | 903/902 |
| 2012/0309587 A1* | 12/2012 | Nozaki | ................ | B60W 10/02 |
| | | | | 180/65.265 |
| 2013/0012353 A1* | 1/2013 | Yoshida | ................ | B60L 15/2045 |
| | | | | 903/902 |
| 2013/0103244 A1* | 4/2013 | Ichinose | ................ | B60W 10/08 |
| | | | | 701/22 |
| 2013/0296123 A1* | 11/2013 | Doering | ................ | B60W 20/40 |
| | | | | 477/174 |
| 2014/0052320 A1* | 2/2014 | Kamono | ................ | B60W 20/11 |
| | | | | 180/65.265 |
| 2014/0058604 A1* | 2/2014 | Ito | ................ | B60W 10/06 |
| | | | | 180/65.265 |
| 2015/0080173 A1* | 3/2015 | Hayashi | ................ | B60W 10/02 |
| | | | | 903/902 |
| 2015/0088351 A1* | 3/2015 | Meeks | ................ | B60W 50/0225 |
| | | | | 701/99 |
| 2015/0258983 A1* | 9/2015 | Kimura | ................ | B60K 6/547 |
| | | | | 903/902 |
| 2015/0291171 A1* | 10/2015 | Kuroki | ................ | B60W 30/18136 |
| | | | | 701/70 |
| 2016/0368474 A1* | 12/2016 | Komuro | ................ | B60K 6/387 |
| 2017/0008529 A1* | 1/2017 | Kim | ................ | B60W 20/14 |
| 2018/0208200 A1* | 7/2018 | Du | ................ | B60W 30/18109 |
| 2018/0265073 A1* | 9/2018 | Kawanishi | ................ | B60W 20/40 |
| 2018/0326867 A1* | 11/2018 | Yoneda | ................ | B60L 7/26 |
| 2019/0039597 A1* | 2/2019 | Hawley | ................ | B60W 30/18127 |
| 2020/0086761 A1* | 3/2020 | Hamada | ................ | B60L 58/16 |
| 2020/0180632 A1* | 6/2020 | Morita | ................ | B60T 8/00 |
| 2021/0070263 A1* | 3/2021 | Kono | ................ | B60T 8/171 |

\* cited by examiner

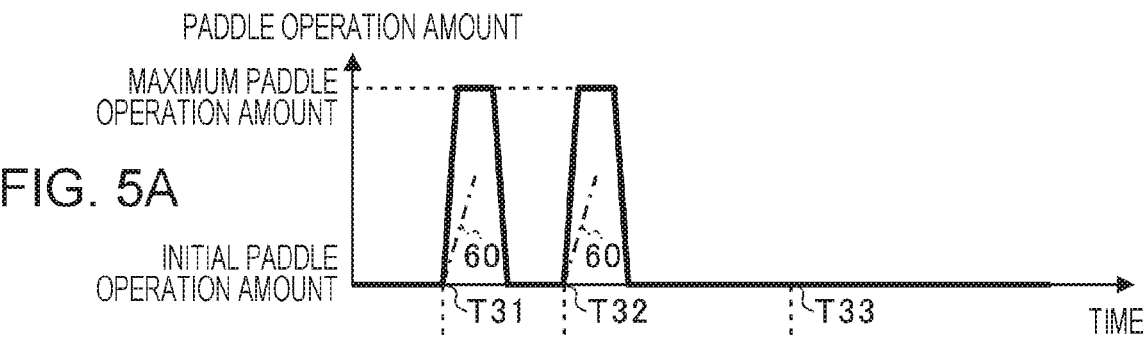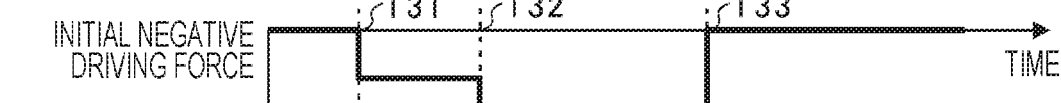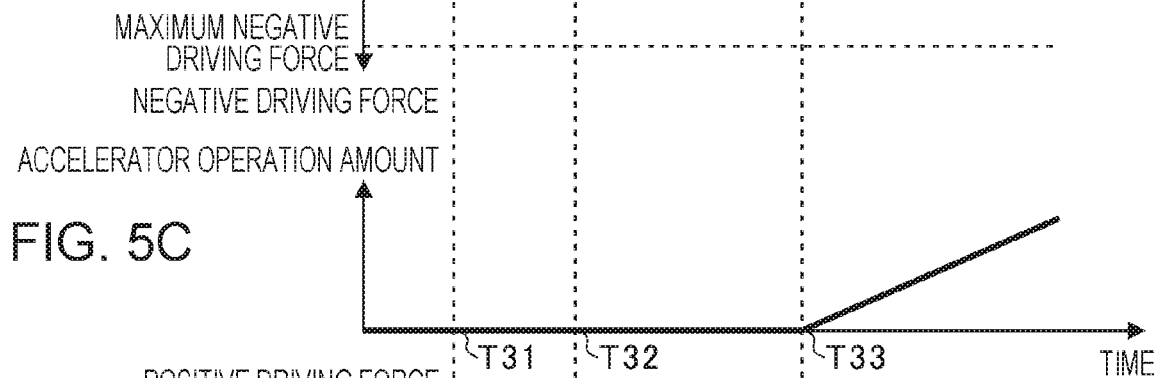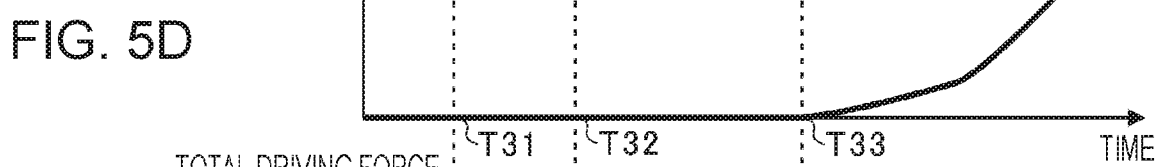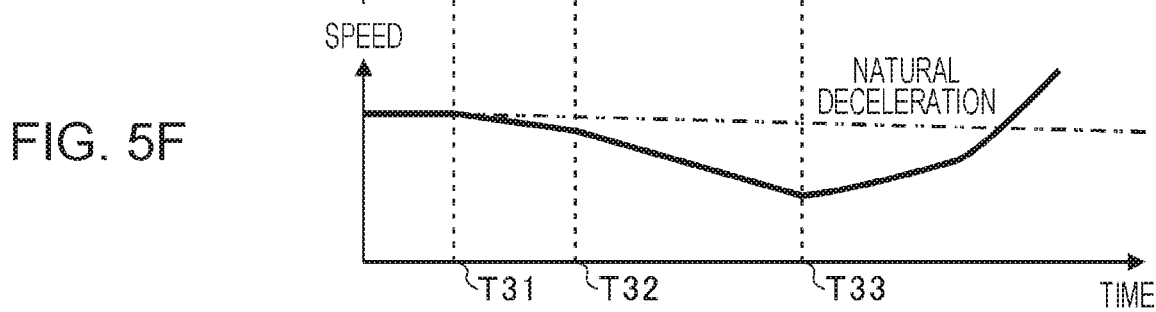

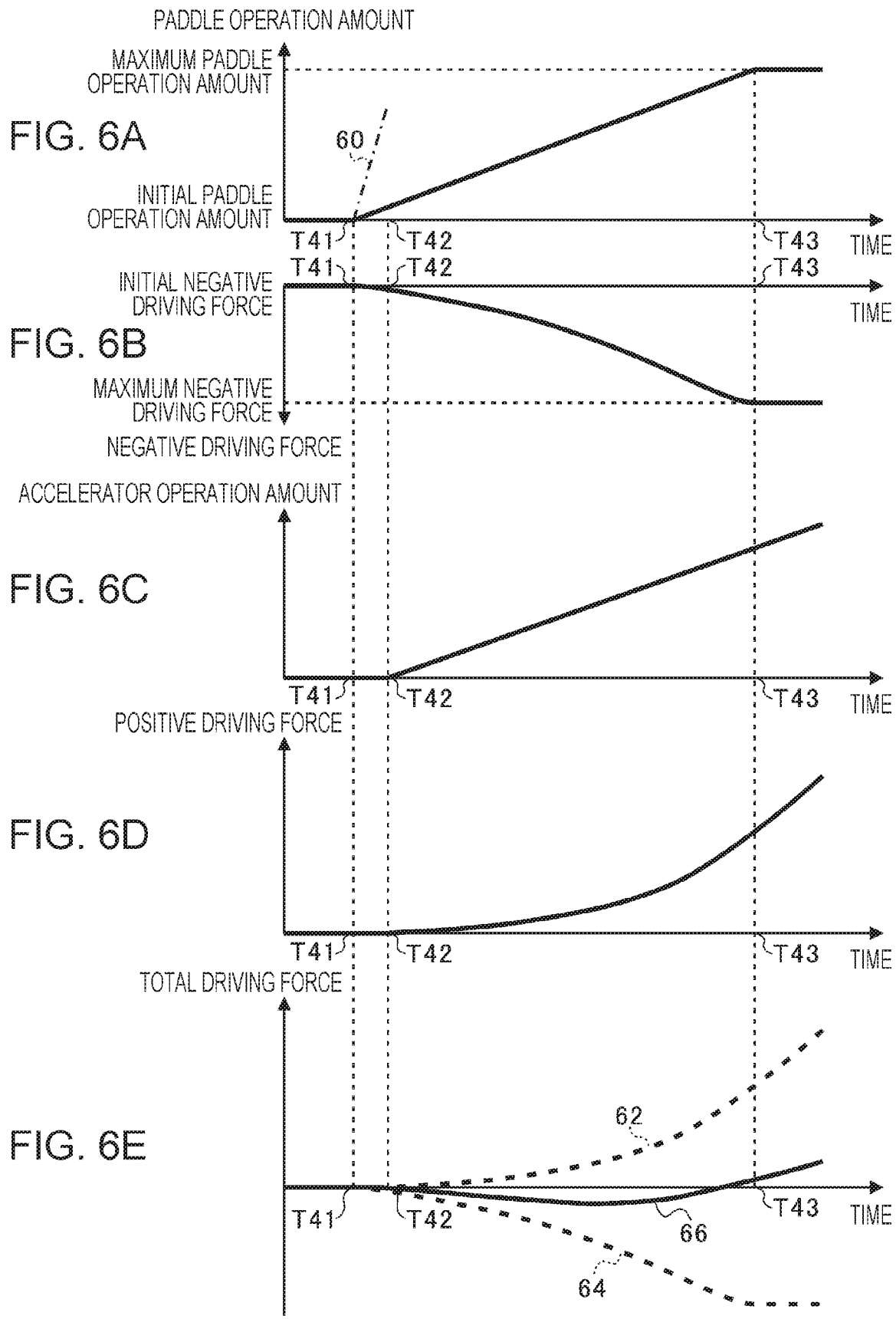

CONTROL DEVICE FOR VEHICLE AND VEHICLE

CROSS-REFERENCE TO RELATED APPLICATIONS

The present application claims priority from Japanese Patent Application No. 2019-212885 filed on Nov. 26, 2019, the entire contents of which are hereby incorporated by reference.

BACKGROUND

The disclosure relates to a control device for a vehicle and the vehicle including a motor as a driving source.

Japanese Unexamined Patent Application Publication (JP-A) No. 2015-104149 discloses a vehicle capable of changing the regeneration level stepwise in response to turning on and off of a paddle shift switch.

SUMMARY

An aspect of the disclosure provides a control device for a vehicle, including an operation unit, an operation-unit sensor, a motor, and a driving force controller. The operation-unit sensor is configured to detect an operation-unit operation amount. The operation-unit operation amount is an amount of operation of the operation unit. The motor is capable of generating a negative driving force for decelerating the vehicle. The driving force controller is configured to cause the motor to drive a wheel of the vehicle with the negative driving force on a basis of the operation-unit operation amount, and to derive the negative driving force in accordance with an initial time change. The initial time change represents an amount of change in the operation-unit operation amount per unit time relative to an operation-unit operation amount at an initial position of the operation unit.

An aspect of the disclosure provides a vehicle including an operation unit, an operation-unit sensor, a motor, and a driving force controller. The operation-unit sensor is configured to detect an operation-unit operation amount. The operation-unit operation amount is an amount of operation of the operation unit. The motor is capable of generating a negative driving force for decelerating the vehicle. The driving force controller is configured to cause the motor to drive a wheel of the vehicle with the negative driving force on a basis of the operation-unit operation amount, and to derive the negative driving force in accordance with an initial time change. The initial time change represents an amount of change in the operation-unit operation amount per unit time relative to an operation-unit operation amount at an initial position of the operation unit.

An aspect of the disclosure provides a control device for a vehicle, including an operation unit, a sensor, a motor, and circuitry. The sensor is configured to detect an operation-unit operation amount. The operation-unit operation amount is an amount of operation of the operation unit. The motor is capable of generating a negative driving force for decelerating the vehicle. The circuitry is configured to cause the motor to drive a wheel of the vehicle with the negative driving force on a basis of the operation-unit operation amount, and to derive the negative driving force in accordance with an initial time change. The initial time change represents an amount of change in the operation-unit operation amount per unit time relative to an operation-unit operation amount at an initial position of the operation unit.

An aspect of the disclosure provides a vehicle including an operation unit, a sensor, a motor, and circuitry. The sensor is configured to detect an operation-unit operation amount. The operation-unit operation amount is an amount of operation of the operation unit. The motor is capable of generating a negative driving force for decelerating the vehicle. The circuitry is configured to cause the motor to drive a wheel of the vehicle with the negative driving force on a basis of the operation-unit operation amount, and to derive the negative driving force in accordance with an initial time change. The initial time change represents an amount of change in the operation-unit operation amount per unit time relative to an operation-unit operation amount at an initial position of the operation unit.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

FIGS. 2A and 2B are schematic diagrams illustrating an example of a paddle lever and a paddle stroke sensor, in which FIG. 2A illustrates a state in which the paddle lever is not in use, and FIG. 2B illustrates a state in which the paddle lever is in use at the maximum paddle operation amount;

FIGS. 3A to 3C are diagrams illustrating a switch mode, in which FIG. 3A illustrates how the paddle operation amount varies with time, FIG. 3B illustrates how the negative driving force varies with time, and FIG. 3C illustrates how the speed of the vehicle varies with time;

FIGS. 4A to 4C are diagrams illustrating an analog mode, in which FIG. 4A illustrates how the paddle operation amount varies with time, FIG. 4B illustrates how the negative driving force varies with time, and FIG. 4C illustrates how the speed of the vehicle varies with time;

FIGS. 5A to 5F are diagrams illustrating the relationship between the paddle operation amount and the accelerator operation amount in the switch mode, in which FIG. 5A illustrates how the paddle operation amount varies with time, FIG. 5B illustrates how the negative driving force varies with time, FIG. 5C illustrates how the accelerator operation amount varies with time, FIG. 5D illustrates how the positive driving force varies with time, FIG. 5E illustrates how the total driving force varies with time, and FIG. 5F illustrates how the speed of the vehicle varies with time;

FIGS. 6A to 6E are diagrams illustrating the relationship between the paddle operation amount and the accelerator operation amount in the analog mode, in which FIG. 6A illustrates how the paddle operation amount varies with time, FIG. 6B illustrates how the negative driving force varies with time, FIG. 6C illustrates how the accelerator operation amount varies with time, FIG. 6D illustrates how the positive driving force varies with time, and FIG. 6E illustrates how the total driving force varies with time;

FIGS. 7A and 7B are diagrams illustrating an example combination of the switch mode and the analog mode, in which FIG. 7A illustrates how the paddle operation amount varies with time, and FIG. 7B illustrates how the negative driving force varies with time;

FIGS. 8A and 8B are diagrams illustrating another example combination of the switch mode and the analog mode, in which FIG. 8A illustrates how the paddle operation amount varies with time, and FIG. 8B illustrates how the negative driving force varies with time;

FIGS. 10A to 10F are diagrams illustrating an example of the operation of a driving force controller in the situation illustrated in FIG. 9, in which FIG. 10A illustrates how the paddle operation amount varies with time, FIG. 10B illustrates how the negative driving force varies with time, FIG. 10C illustrates how the accelerator operation amount varies with time, FIG. 10D illustrates how the positive driving force varies with time, FIG. 10E illustrates how the total driving force varies with time, and FIG. 10F illustrates how the speed of the vehicle varies with time;

DETAILED DESCRIPTION

In JP-A No. 2015-104149, the deceleration rate of the vehicle changes stepwise in response to turning on of the paddle shift switch, and it may be difficult to change the deceleration rate of the vehicle as desired according to the driver's intention.

It is desirable to provide a control device for a vehicle and the vehicle that are capable of decelerating the vehicle as desired according to the driver's intention.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
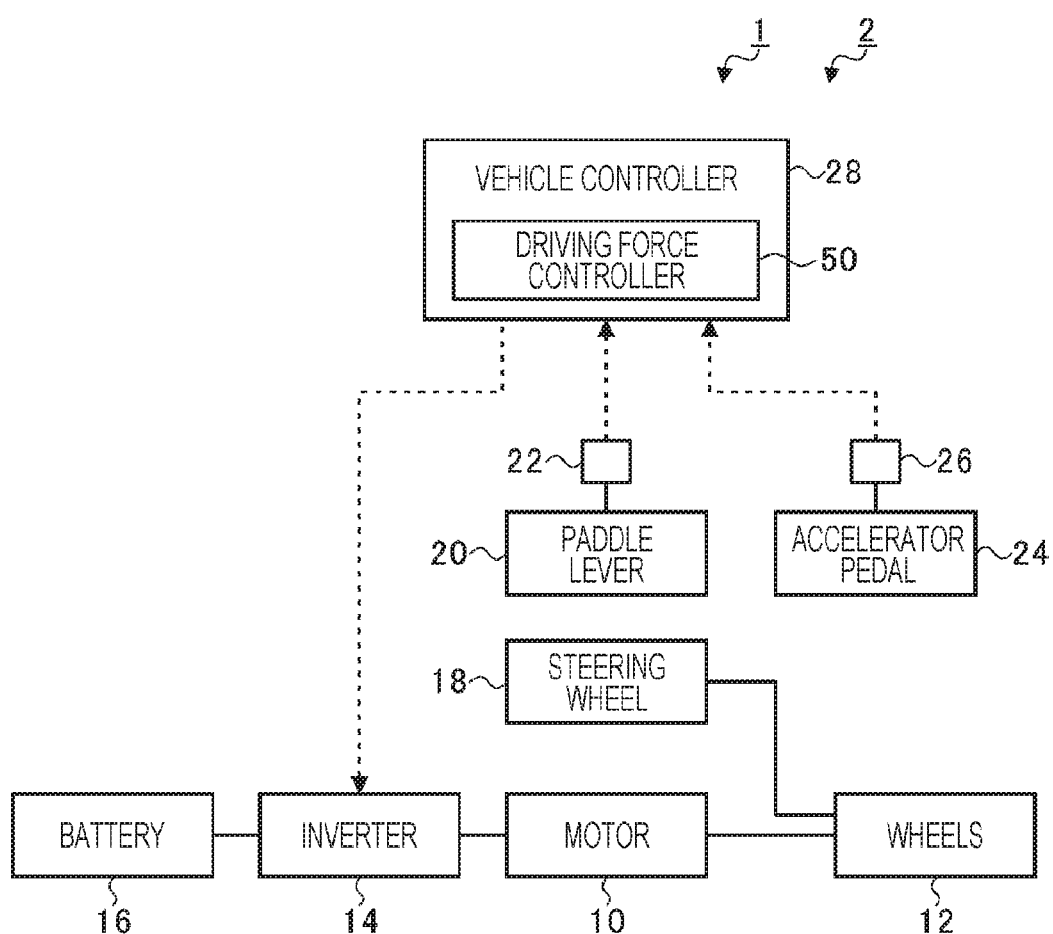
FIG. 1 is a schematic diagram illustrating a configuration of a vehicle according to an embodiment of the disclosure.

FIG. 1 is a schematic diagram illustrating a configuration of a vehicle 1 according to this embodiment. Hereinafter, configurations and processes related to this embodiment will be described in detail, whereas configurations or processes irrelevant to this embodiment will not be described.

The vehicle 1 includes a control device 2 for controlling the vehicle 1. The control device 2 of the vehicle 1 includes a motor 10, wheels 12, an inverter 14, a battery 16, a steering wheel 18, a paddle lever 20, a paddle stroke sensor 22, an accelerator pedal 24, an accelerator pedal sensor 26, and a vehicle controller 28.

The vehicle 1 is an electric vehicle in which the wheels 12 are driven by the motor 10. The vehicle 1 may be a hybrid electric vehicle provided with an engine in parallel with the motor 10 to drive the wheels 12.

Examples of the motor 10 include a synchronous motor and an induction motor. A rotary shaft of the motor 10 is coupled to the wheels 12 via a transmission (not illustrated) or the like. The inverter 14 includes a plurality of bridge-coupled switching elements and diodes. The inverter 14 converts the direct-current (DC) power of the battery 16 to alternating-current (AC) power in response to turning on and off of the switching elements and supplies the AC power to the motor 10. The motor 10 consumes the power supplied via the inverter 14 and rotates the rotary shaft. As a result, the wheels 12, which are coupled to the rotary shaft, are driven.

Further, the motor 10 works as a generator that generates power in accordance with the rotation of the wheels 12 during braking of the vehicle 1. In this case, the inverter 14 converts the AC power generated by the motor 10 to DC power to regenerate the battery 16.

The steering wheel 18 is coupled to the wheels 12 via a steering mechanism (not illustrated). The steering wheel 18 accepts the driver's steering operation. In response to the steering wheel 18 being steered, the direction of the wheels 12 is changed.

The paddle lever 20 is disposed near the steering wheel 18. The term "near" refers to a location within the reach of the driver whose hands are on the steering wheel 18, for example. The paddle lever 20 accepts the driver's braking operation (for example, the braking operation performed by hand). In response to the braking operation being performed on the paddle lever 20, the power generated by the motor 10 is regenerated, and the vehicle 1 is decelerated. In one embodiment, the paddle lever may serve as an "operation unit" configured to accept a braking operation. The paddle lever 20 is provided independently of the brake pedal.

In this embodiment, the paddle lever 20 is described as an operation unit. However, an example of the operation unit is not limited to the paddle lever 20. For example, the operation unit may be disposed in front of and below the driver's seat and configured to accept the driver's braking operation performed by foot, or may be disposed on a side of the driver's seat and configured to accept the driver's braking operation performed by hand or arm. Alternatively, the operation unit may be disposed in a console or the like.

The paddle stroke sensor 22 detects a paddle operation amount that is an amount of operation of the paddle lever 20. In one embodiment, the paddle stroke sensor 22 may serve as an "operation-unit sensor" configured to detect an operation-unit operation amount that is an amount of operation of the operation unit.

Figure 2A:
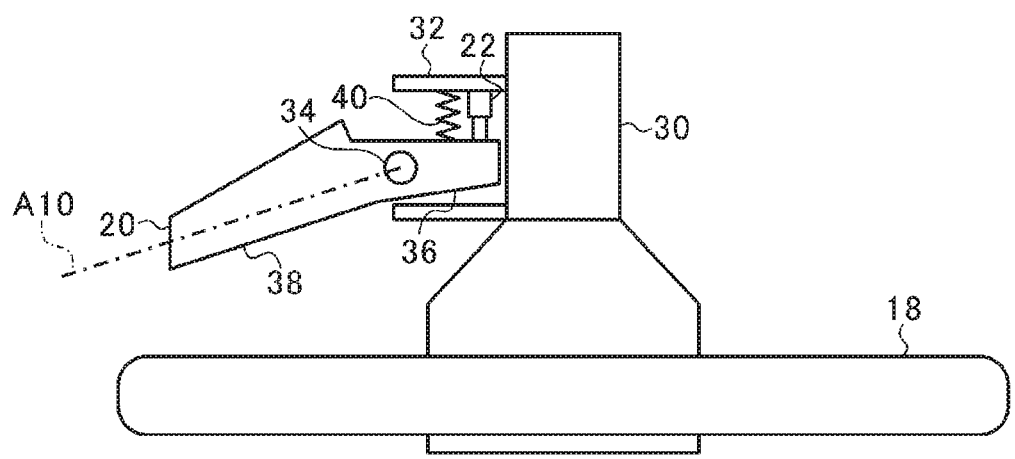
Figure 2B:
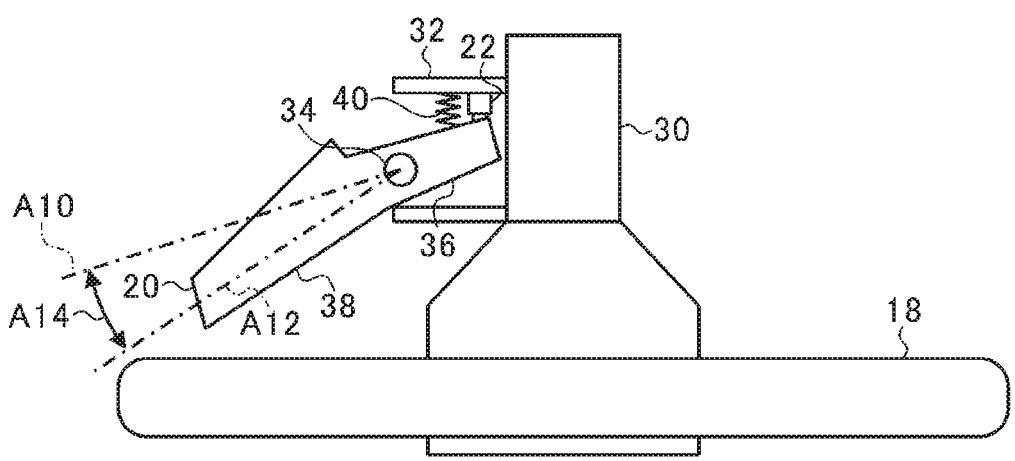

FIGS. 2A and 2B are schematic diagrams illustrating an example of the paddle lever 20 and the paddle stroke sensor 22. FIG. 2A illustrates a state in which the paddle lever 20 is not in use. FIG. 2B illustrates a state in which the paddle lever 20 is in use at the maximum paddle operation amount.

The steering wheel 18 is coupled to a steering shaft 30. The steering shaft 30 works as a portion of the steering mechanism. A paddle support 32 is coupled to an outer circumferential surface of the steering shaft 30 at a location near the steering wheel 18. In FIGS. 2A and 2B, the inside of the paddle support 32 is illustrated in perspective view. A shaft 34 extends in a direction perpendicular to the steering shaft 30 and is supported by the paddle support 32. The paddle lever 20 is supported by the paddle support 32 in such a manner as to be swingable about the shaft 34. The paddle lever 20 and the paddle support 32 are rotatable in the circumferential direction in synchronization of the rotation of the steering shaft 30 and the steering wheel 18.

The paddle lever 20 has a load portion 36 and an effort portion 38 with the shaft 34 interposed therebetween. The load portion 36 is received within the paddle support 32. The effort portion 38 extends outward from the paddle support 32. The braking operation for the paddle lever 20 is performed on the effort portion 38.

The paddle lever 20 is swingable in a direction approaching the steering wheel 18 and in a direction away from the steering wheel 18 (a direction in which the steering shaft extends). For example, when the effort portion 38 is displaced in the direction approaching the steering wheel 18, the load portion 36 is displaced in the direction away from the steering wheel 18. When the effort portion 38 is displaced in the direction away from the steering wheel 18, the load portion 36 is displaced in the direction approaching the steering wheel 18.

The load portion 36 is coupled to an end of an urging member 40. Examples of the urging member 40 include a spring. The other end of the urging member 40 is coupled to the paddle support 32. The urging member 40 urges the load portion 36 in the direction approaching the steering wheel 18. That is, the effort portion 38 is urged in the direction away from the steering wheel 18 by the urging member 40.

As illustrated in FIG. 2A, when the paddle lever 20 is not in use, due to the urging force of the urging member 40, the effort portion 38 is the farthest away from the steering wheel 18, and the load portion 36 is the closest to the steering wheel 18. The position of the paddle lever 20 in this state is referred to as an initial position. A one-dot chain line A10 exemplarily indicates the direction in which the effort portion 38 extends when the paddle lever 20 is in the initial position.

As illustrated in FIG. 2B, when the effort portion 38 becomes the closest to the steering wheel 18 while working against the urging force, the load portion 36 becomes the farthest away from the steering wheel 18. The position of the paddle lever 20 in this state is referred to as a maximum position. A one-dot chain line A12 exemplarily indicates the direction in which the effort portion 38 extends when the paddle lever 20 is in the maximum position. An arrow A14 indicates the stroke of the paddle lever 20 from the initial position to the maximum position.

The paddle stroke sensor 22 is disposed between the load portion 36 and the paddle support 32. The paddle stroke sensor 22 senses a paddle operation amount indicating the amount of movement (or swing) of the paddle lever 20 relative to the initial position. For example, the paddle stroke sensor 22 includes a cylinder and a plunger. The cylinder is fixed to the paddle support 32. The plunger has an end inserted in the cylinder and another end coupled to the load portion 36. When the paddle lever 20 is swung, the amount of insertion of the plunger into the cylinder changes. The amount of insertion of the plunger is associated with the amount of swing of the paddle lever 20. The paddle stroke sensor 22 converts the rotational (or swinging) displacement of the paddle lever 20 into linear displacement and detects the paddle operation amount.

The paddle stroke sensor 22 is capable of not only binary sensing of off and on states corresponding to the initial position and the maximum position, respectively, but also fine sensing of values of the paddle operation amount between the initial position and the maximum position in an analog fashion. The paddle operation amount increases as the paddle lever 20 is pulled in the direction approaching the steering wheel 18, and decreases as the paddle lever 20 is returned in the direction away from the steering wheel 18.

Hereinafter, the paddle operation amount (or operation-unit operation amount) obtained when the paddle lever 20 (or operation unit) is in the initial position is sometimes referred to as an initial paddle operation amount (or initial operation-unit operation amount). The paddle operation amount (or operation-unit operation amount) obtained when the paddle lever 20 (or operation unit) is in the maximum position is sometimes referred to as a maximum paddle operation amount (or maximum operation-unit operation amount).

In FIGS. 2A and 2B, by way of example, the paddle operation amount increases as the paddle lever 20 is pulled in the direction approaching the steering wheel 18. Alternatively, the paddle lever 20 may be configured such that the paddle operation amount increases as the paddle lever 20 is pushed in the direction away from the steering wheel 18 relative to an initial position at which the paddle lever 20 is the closest to the steering wheel 18.

Referring back to FIG. 1, the accelerator pedal 24 accepts the driver's acceleration operation. The accelerator pedal sensor 26 detects an accelerator operation amount that is an amount of operation of the accelerator pedal 24, or, in other words, an amount of depression of the accelerator pedal 24.

The vehicle controller 28 is constituted by a semiconductor integrated circuit including a central processing unit (CPU), a read-only memory (ROM) storing a program and the like, and a random access memory (RAM) serving as a work area. The vehicle controller 28 executes a program to work as a driving force controller 50.

The driving force controller 50 derives a positive driving force based on the accelerator operation amount detected by the accelerator pedal sensor 26. The positive driving force is a driving force for driving (or accelerating) the vehicle 1 against the travel resistance of the vehicle 1. The driving force controller 50 transmits a driving force command value for achieving the derived driving force to the inverter 14. The inverter 14 supplies power to the motor 10 in accordance with the driving force command value. Accordingly, the motor 10 drives the wheels 12 with the positive driving force based on the accelerator operation amount. In other words, the motor 10 is capable of generating a positive driving force in accordance with the accelerator operation amount.

Further, the driving force controller 50 derives a negative driving force based on the paddle operation amount detected by the paddle stroke sensor 22. The negative driving force is a driving force for more quickly decelerating the vehicle 1 than the natural deceleration rate at which the vehicle 1 is naturally decelerated according to the travel resistance of the vehicle 1. The driving force controller 50 transmits a driving force command value for achieving the derived negative driving force to the inverter 14. The inverter 14 regenerates power in accordance with the driving force command value. Accordingly, the motor 10 brakes the wheels 12 with the negative driving force based on the paddle operation amount. In other words, the motor 10 is capable of generating a negative driving force in accordance with the paddle operation amount.

The vehicle 1 has two control modes for controlling the paddle lever 20, including a switch mode and an analog mode. The switch mode is a mode for increasing the absolute value of the negative driving force stepwise by a predetermined value. The analog mode is a mode for progressively increasing the absolute value of the negative driving force in a smooth manner in accordance with an increase in paddle operation amount. In the analog mode, the negative driving force may be progressively increased in a proportional manner in accordance with an increase in paddle operation amount, or may be progressively increased in a curved manner such as in a quadratic-function manner.

The amount of change in the paddle operation amount (or operation-unit operation amount) per unit time relative to that at the initial position of the paddle lever 20 (or operation unit) is sometimes referred to as an initial time change. In other words, the initial time change represents the amount of change in the paddle operation amount (or operation-unit operation amount) over time relative to the initial paddle operation amount (or initial operation-unit operation amount).

When the initial time change in paddle operation amount is greater than or equal to a predetermined amount, the driving force controller 50 performs control in the switch mode. When the initial time change in paddle operation amount is less than the predetermined amount, the driving force controller 50 performs control in the analog mode.

The predetermined amount is set in consideration of, for example, the speed at which the driver pulls the paddle lever 20. For example, when the stroke of the paddle lever 20 is assumed to be 30°, an example of the predetermined amount may be the rate at which the paddle lever 20 is pulled in 0.4 seconds from the initial position to the maximum position, which is given by 30°/0.4 seconds.

Figure 3A:
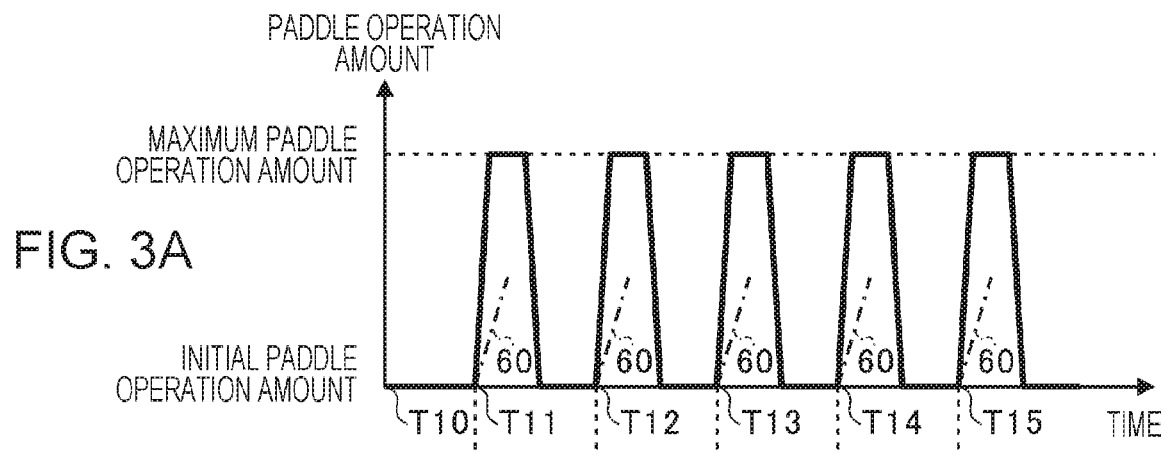
Figure 3B:
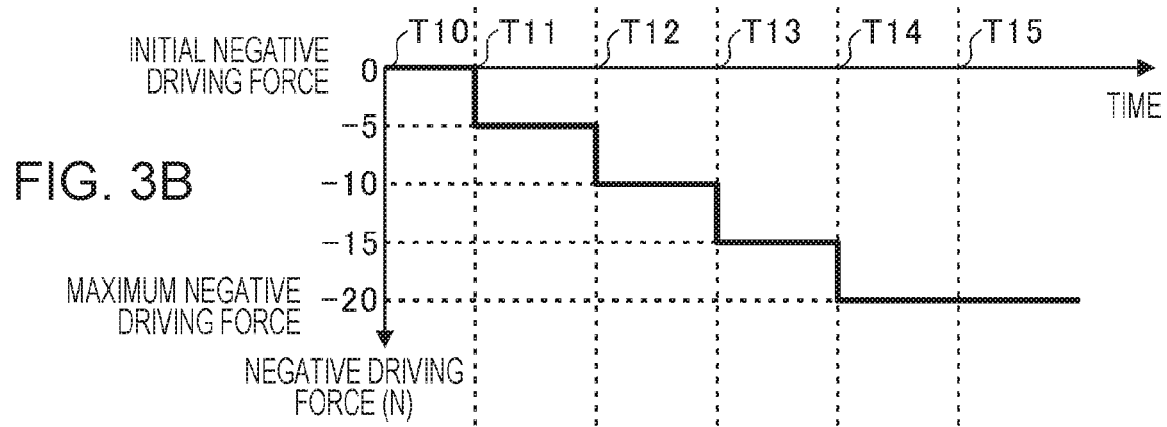
Figure 3C:
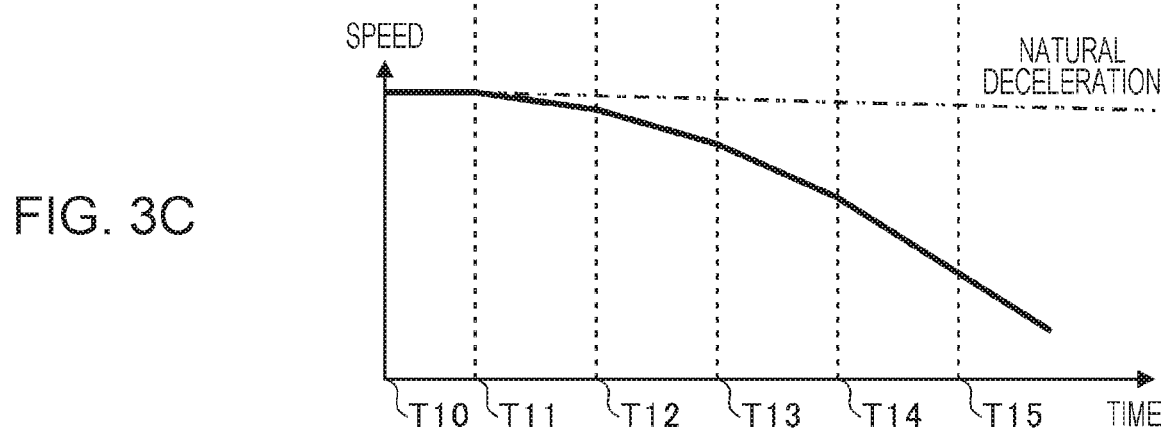

FIGS. 3A to 3C are diagrams illustrating the switch mode. FIG. 3A illustrates how the paddle operation amount varies with time. FIG. 3B illustrates how the negative driving force varies with time. FIG. 3C illustrates how the speed of the vehicle 1 varies with time. In FIG. 3A, the predetermined amount for the initial time change is indicated by a one-dot chain line 60. At time T10, the paddle operation amount is assumed to be equal to the initial paddle operation amount, and the negative driving force is assumed to be equal to an initial negative driving force corresponding to the initial paddle operation amount. The initial negative driving force is zero, for example.

At time T11 after the time T10, as illustrated in FIG. 3A, the driver is assumed to quickly pull the paddle lever 20 from the initial position so that the initial time change in paddle operation amount becomes greater than or equal to the predetermined amount. In the following, the term "quickly pulling" refers to pulling the paddle lever 20 at a speed such that the paddle operation amount per unit time becomes greater than or equal to the predetermined amount. In this case, the driving force controller 50 sets the control mode to the switch mode. As illustrated in FIG. 3B, the driving force controller 50 increases the absolute value of the negative driving force by a predetermined value from the current value and maintains the negative driving force whose absolute value has been increased.

The predetermined value is set to, for example, a value obtained by dividing the difference between the maximum negative driving force and the initial negative driving force by a predetermined division number. For example, the maximum negative driving force is −20 N, the initial negative driving force is 0 N, and the division number is 4. In this case, the predetermined value is set to −5 N. The maximum negative driving force may be changed in accordance with the speed of the vehicle 1. When the maximum negative driving force is changed, the predetermined value described above may be changed on the basis of the changed maximum negative driving force. For example, when the maximum negative driving force is −40 N, the division number may be set to 4, and the predetermined value may be set to −10 N.

When the absolute value of the negative driving force is increased by the predetermined value, as illustrated in FIG. 3C, the speed of the vehicle 1 decreases in accordance with the negative driving force derived at the time T11 since the deceleration rate is larger than the natural deceleration rate.

After the time T11, as illustrated in FIG. 3A, the driver is assumed to return the paddle lever 20 to the initial position. At time T12, the driver is assumed to quickly pull the paddle lever 20 from the initial position again. As illustrated in FIG. 3B, the driving force controller 50 again increases the absolute value of the negative driving force by the predetermined value from the current value and maintains the negative driving force whose absolute value has been increased. That is, the absolute value of the negative driving force is further increased by the predetermined value from the value derived at the time T11. Then, as illustrated in FIG. 3C, the speed of the vehicle 1 decreases in accordance with the negative driving force (e.g., −10 N) derived at the time T12.

Thereafter, when the paddle lever 20 is quickly pulled from the initial position another two times, the absolute value of the negative driving force is further increased in two steps in a manner similar to that described above. As a result, the maximum negative driving force is obtained. If the paddle lever 20 is further quickly pulled from the initial position after the maximum negative driving force is obtained, the driving force controller 50 maintains the maximum negative driving force.

In this way, an operation of quickly pulling the paddle lever 20 from the initial position is repeatedly performed a plurality of times, thereby providing a stepwise increase in the absolute value of the negative driving force up to the absolute value of the maximum negative driving force. Accordingly, the speed of the vehicle 1 decreases stepwise.

Figure 4A:
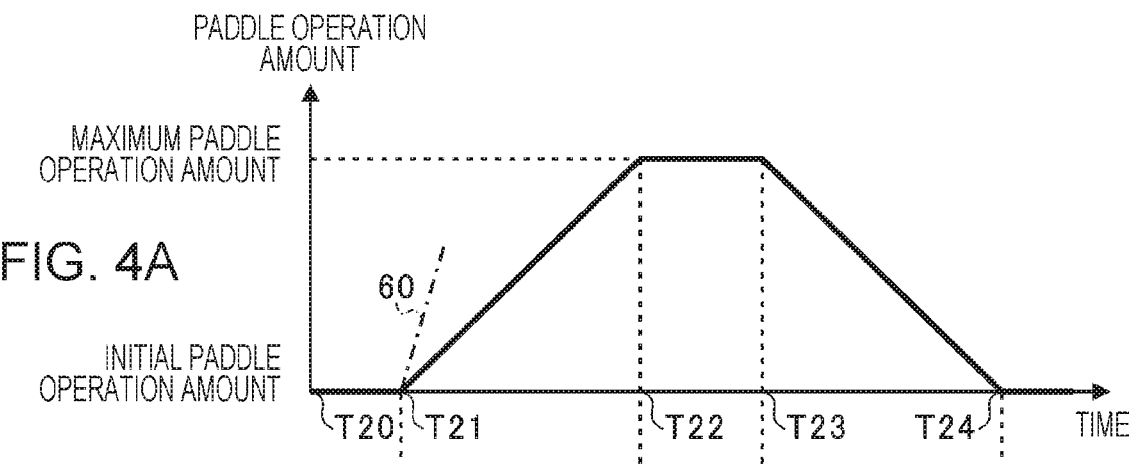
Figure 4B:
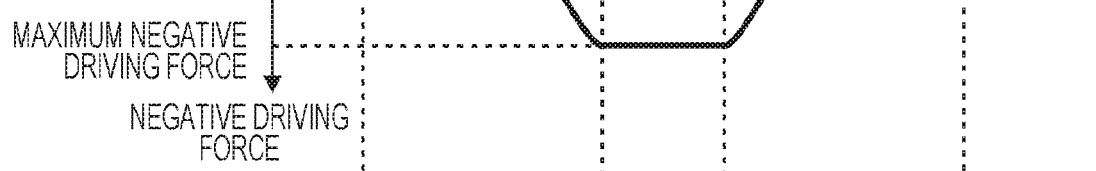
Figure 4C:
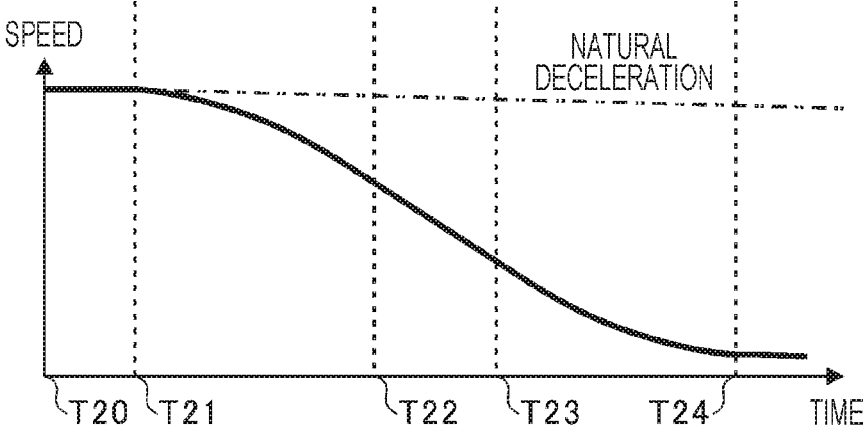

FIGS. 4A to 4C are diagrams illustrating the analog mode. FIG. 4A illustrates how the paddle operation amount varies with time. FIG. 4B illustrates how the negative driving force varies with time. FIG. 4C illustrates how the speed of the vehicle 1 varies with time. In FIG. 4A, the predetermined amount for the initial time change in paddle operation amount is indicated by the one-dot chain line 60. At time T20, the paddle operation amount is assumed to be equal to the initial paddle operation amount, and the negative driving force is assumed to be equal to the initial negative driving force.

At time T21 after the time T20, as illustrated in FIG. 4A, the driver is assumed to slowly pull the paddle lever 20 from the initial position so that the initial time change in paddle operation amount becomes less than the predetermined amount. In the following, the term "slowly pulling" refers to pulling the paddle lever 20 at a speed such that the paddle operation amount per unit time becomes less than the predetermined amount. In this case, the driving force controller 50 sets the control mode to the analog mode. As illustrated in FIG. 4B, the driving force controller 50 derives a negative driving force corresponding to the current paddle operation amount. Accordingly, as illustrated in FIG. 4A, when the paddle operation amount is slowly increased, as illustrated in FIG. 4B, the negative driving force smoothly varies in a curved manner as the paddle operation amount varies. Then, as illustrated in FIG. 4C, the deceleration rate of the vehicle 1 smoothly increases.

At time T22 after the time T21, as illustrated in FIG. 4A, the paddle operation amount is assumed to reach the maximum paddle operation amount. At this time, as illustrated in FIG. 4B, the negative driving force becomes equal to the maximum negative driving force. If the paddle operation amount is maintained at the maximum paddle operation amount, the negative driving force is also maintained at the maximum negative driving force.

At time T23 after the time T22, as illustrated in FIG. 4A, the driver is assumed to slowly return the paddle lever 20 from the maximum position, and the paddle operation amount is assumed to be slowly decreased. In this case, as illustrated in FIG. 4B, the negative driving force smoothly varies in a curved manner as the paddle operation amount varies. Then, as illustrated in FIG. 4C, the deceleration rate of the vehicle 1 smoothly decreases.

At time T24 after the time T23, as illustrated in FIG. 4A, the paddle operation amount is assumed to become equal to the initial paddle operation amount. At this time, as illustrated in FIG. 4B, the negative driving force is returned to the initial negative driving force.

The analog mode continues until the paddle lever 20 is returned to the initial position. That is, when the initial time change is determined to be less than the predetermined amount and the control in the analog mode is started, the analog mode continues until the paddle operation amount is returned to the initial paddle operation amount. In the case illustrated in FIGS. 4A to 4C, the analog mode is started at the time T21, and the analog mode is terminated at the time T24.

FIGS. 5A to 5F are diagrams illustrating the relationship between the paddle operation amount and the accelerator operation amount in the switch mode. FIG. 5A illustrates how the paddle operation amount varies with time. FIG. 5B illustrates how the negative driving force varies with time. FIG. 5C illustrates how the accelerator operation amount varies with time. FIG. 5D illustrates how the positive driving force varies with time. FIG. 5E illustrates how the total driving force varies with time. FIG. 5F illustrates how the speed of the vehicle 1 varies with time.

As illustrated in FIG. 5A, the driver is assumed to quickly pull the paddle lever 20 from the initial position at time T31, return the paddle lever 20 to the initial position, and then quickly pull the paddle lever 20 from the initial position at time T32. Then, as illustrated in FIG. 5B, the absolute value of the negative driving force is increased in two steps from the initial negative driving force and is then maintained.

At time T33 after the time T32, as illustrated in FIG. 5C, the accelerator is assumed to be turned on. Then, as illustrated in FIG. 5B, the driving force controller 50 resets the maintained negative driving force to the initial negative driving force (zero). Accordingly, the switch mode is terminated.

After the time T33, as illustrated in FIG. 5C, when the accelerator operation amount is increased, as illustrated in FIG. 5D, the driving force controller 50 increases the positive driving force in accordance with the accelerator operation amount.

A driving force that is the sum of the negative driving force and the positive driving force is sometimes referred to as a total driving force. As illustrated in FIG. 5E, during the control in the switch mode (the period from the time T31 to the time T33), the total driving force corresponds to the negative driving force. After the switch mode is terminated by turning on the accelerator (after the time T33), the total driving force corresponds to the positive driving force. Accordingly, as illustrated in FIG. 5F, the speed of the vehicle 1 decreases in accordance with the negative driving force and then increases in accordance with the positive driving force.

FIGS. 6A to 6E are diagrams illustrating the relationship between the paddle operation amount and the accelerator operation amount in the analog mode. FIG. 6A illustrates how the paddle operation amount varies with time. FIG. 6B illustrates how the negative driving force varies with time. FIG. 6C illustrates how the accelerator operation amount varies with time. FIG. 6D illustrates how the positive driving force varies with time. FIG. 6E illustrates how the total driving force varies with time.

As illustrated in FIG. 6A, at time T41, the paddle lever 20 is assumed to be slowly pulled from the initial position, and the driving force controller 50 is assumed to set the control mode to the analog mode. After the time T41, as illustrated in FIG. 6B, the absolute value of the negative driving force is gradually increased in accordance with the paddle operation amount.

At time T42 after the time T41, as illustrated in FIG. 6C, the accelerator is assumed to be turned on. However, as illustrated in FIG. 6B, even if the accelerator is turned on during the analog mode, the driving force controller 50 does not reset the negative driving force and does not terminate the analog mode. Accordingly, as illustrated in FIGS. 6A and 6B, if the paddle operation amount is continuously increased, the absolute value of the negative driving force is continuously increased in accordance with the paddle operation amount.

After the time T42, as illustrated in FIG. 6C, if the accelerator operation amount is increased, as illustrated in FIG. 6D, the driving force controller 50 increases the positive driving force in accordance with the accelerator operation amount.

After the time T42, the paddle operation and the accelerator operation are performed in parallel, and the negative driving force and the positive driving force are derived in parallel. Accordingly, as illustrated in FIG. 6E, the driving force controller 50 derives the total driving force, which is the sum of the negative driving force and the positive driving force. In FIG. 6E, the positive driving force illustrated in FIG. 6D is indicated by a broken line 62, the negative driving force illustrated in FIG. 6B is indicated by a broken line 64, and the total driving force is indicated by a solid line 66.

As illustrated in FIG. 6E, the total driving force smoothly decreases when the absolute value of the negative driving force is larger than the positive driving force, and smoothly increases when the positive driving force is larger than the absolute value of the negative driving force. Although not illustrated, the speed of the vehicle 1 smoothly changes in accordance with the total driving force.

As illustrated in FIG. 6B, at time T43, the negative driving force is assumed to reach the maximum negative driving force. Then, as illustrated in FIG. 6E, the total driving force increases progressively in accordance with an increase in the positive driving force.

Figure 7A:
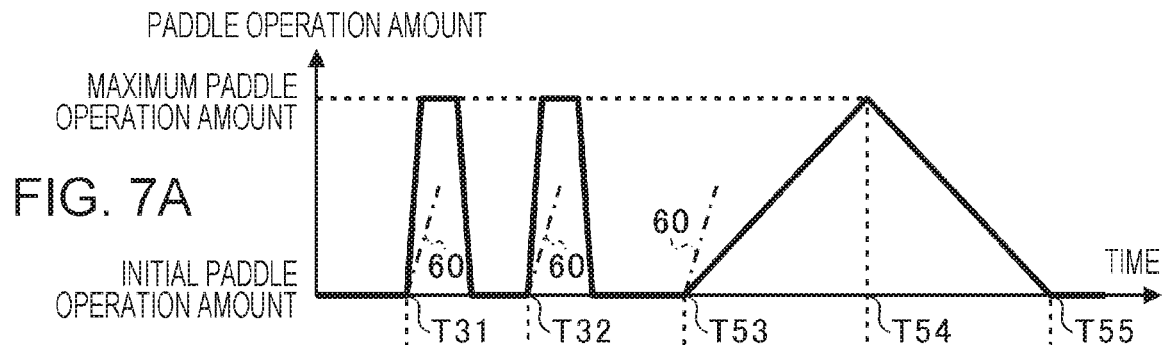
Figure 7B:
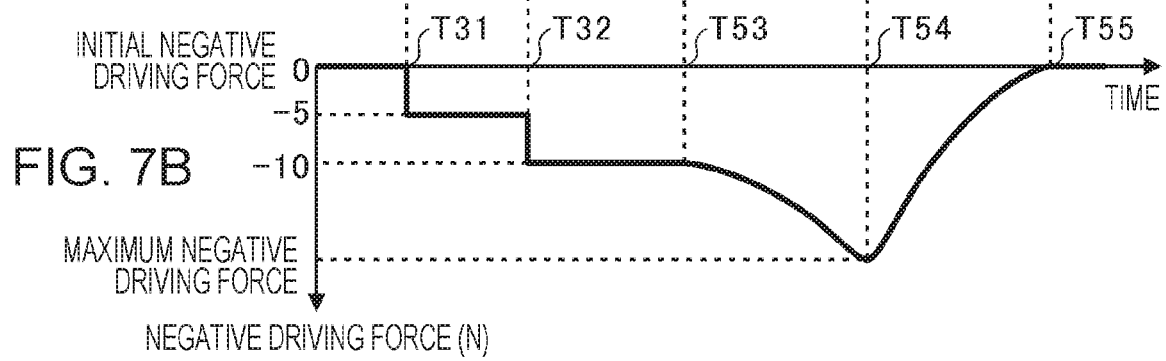

FIGS. 7A and 7B are diagrams illustrating an example combination of the switch mode and the analog mode. FIG. 7A illustrates how the paddle operation amount varies with time. FIG. 7B illustrates how the negative driving force varies with time.

As illustrated in FIG. 7A, first, as in FIG. 5A, the driver is assumed to quickly pull the paddle lever 20 twice. Then, as illustrated in FIG. 7B, as in FIG. 5B, the absolute value of the negative driving force is increased in two steps from the initial negative driving force.

Thereafter, as illustrated in FIG. 7A, at time T53, the driver is assumed to slowly pull the paddle lever 20 from the initial position without turning on the accelerator. At this time, the initial time change in paddle operation amount is assumed to be less than the predetermined amount. Then, as illustrated in FIG. 7B, the driving force controller 50 is switched from the switch mode to the analog mode without resetting the negative driving force to zero. In the case illustrated in FIG. 7B, the negative driving force obtained at the time of switching to the analog mode is a value that is maintained after the negative driving force has been changed in two steps in the switch mode (e.g., −10 N).

As illustrated in FIG. 7A, the paddle operation amount is assumed to be increased gradually after the time T53 and to reach the maximum paddle operation amount at time T54. In this case, as illustrated in FIG. 7B, the absolute value of the negative driving force increases from the value obtained at the time of switching to the analog mode in accordance with the paddle operation amount, and becomes equal to the maximum negative driving force at the time T54.

To achieve this, when the paddle operation amount is increased (when the paddle lever 20 is pulled), the driving force controller 50 derives the negative driving force in accordance with increase-time allocation information. The increase-time allocation information may be a table, a map, or a relational expression. In the increase-time allocation information, a paddle operation amount between a paddle operation amount from which the paddle operation amount starts to increase (e.g., the initial paddle operation amount) and the maximum paddle operation amount is allocated to a negative driving force between a negative driving force obtained at the time when the paddle operation amount starts to increase and the maximum negative driving force. For example, a plurality of pieces of increase-time allocation information are set for respective negative driving forces obtained at the time when the paddle operation amount starts to increase. That is, in the increase-time allocation information, the range within which the absolute value of the negative driving force can be increased is associated with the movable range (stroke) of the paddle lever 20 on the basis of a negative driving force obtained at the time when the paddle operation amount starts to increase.

As illustrated in FIG. 7A, the paddle operation amount is assumed to gradually decrease after the time T54 and then reach the initial paddle operation amount at time T55. In this case, as illustrated in FIG. 7B, the absolute value of the negative driving force decreases from the value obtained at the time when the paddle operation amount starts to decrease (e.g., the maximum negative driving force) in accordance with the paddle operation amount, and becomes equal to the initial negative driving force at the time T55.

To achieve this, when the paddle operation amount is decreased (when the paddle lever 20 is returned), the driving force controller 50 derives the negative driving force in accordance with decrease-time allocation information. The decrease-time allocation information may be a table, a map, or a relational expression. In the decrease-time allocation information, a paddle operation amount between a paddle operation amount from which the paddle operation amount starts to decrease (e.g., the maximum paddle operation amount) and the initial paddle operation amount is allocated to a negative driving force between a negative driving force obtained at the time when the paddle operation amount starts to decrease and the initial negative driving force. For example, a plurality of pieces of decrease-time allocation information are set for respective negative driving forces obtained at the time when the paddle operation amount starts to decrease. That is, in the decrease-time allocation information, the range within which the absolute value of the negative driving force can be decreased is associated with the movable range (stroke) of the paddle lever 20 on the basis of a negative driving force obtained at the time when the paddle operation amount starts to decrease.

Figure 8A:
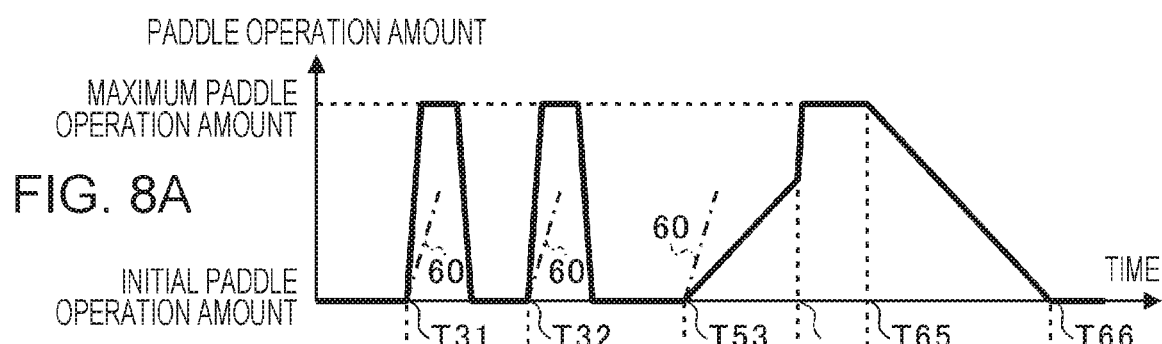
Figure 8B:
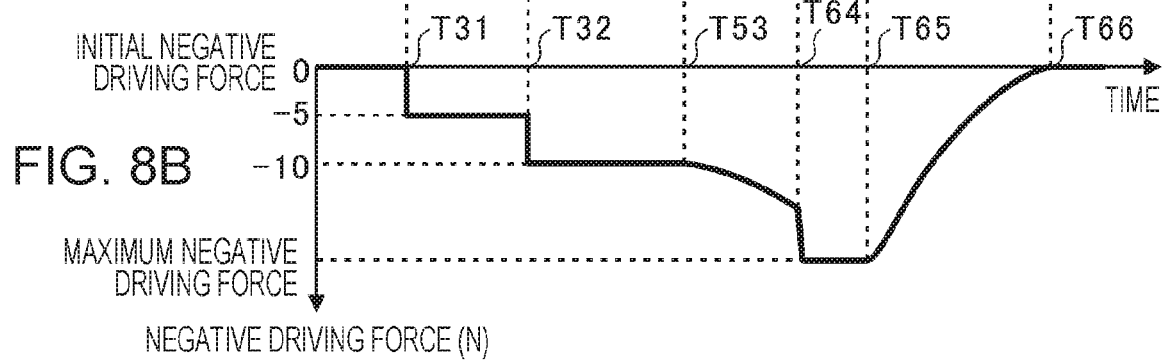

FIGS. 8A and 8B are diagrams illustrating another example combination of the switch mode and the analog mode. FIG. 8A illustrates how the paddle operation amount varies with time. FIG. 8B illustrates how the negative driving force varies with time.

As illustrated in FIG. 8A, the driver is assumed to quickly pull the paddle lever 20 twice and then slowly pull the paddle lever 20 from the initial position at the time T53 without turning on the accelerator. Accordingly, at the time T53, it is assumed that the switch mode is switched to the analog mode. Then, the paddle operation amount is assumed to gradually increase after the time T53.

As illustrated in FIG. 8A, the driver is assumed to quickly pull the paddle lever 20 at time T64 at which the paddle operation amount is located at a position substantially in the middle of the initial paddle operation amount and the maximum paddle operation amount. Since the analog mode continues until the paddle operation amount becomes equal to the initial paddle operation amount, the analog mode continues at the time T64. Accordingly, as illustrated in FIG. 8B, the absolute value of the negative driving force after the time T64 changes in accordance with the paddle operation amount. After the time T64, at time T65, the paddle operation amount is assumed to decrease from the maximum paddle operation amount. Then, at time T66, the paddle operation amount is assumed to become equal to the initial paddle operation amount. In this case, the absolute value of the negative driving force decreases from the maximum negative driving force to the initial negative driving force, and the analog mode is terminated at the time T66.

Figure 9:
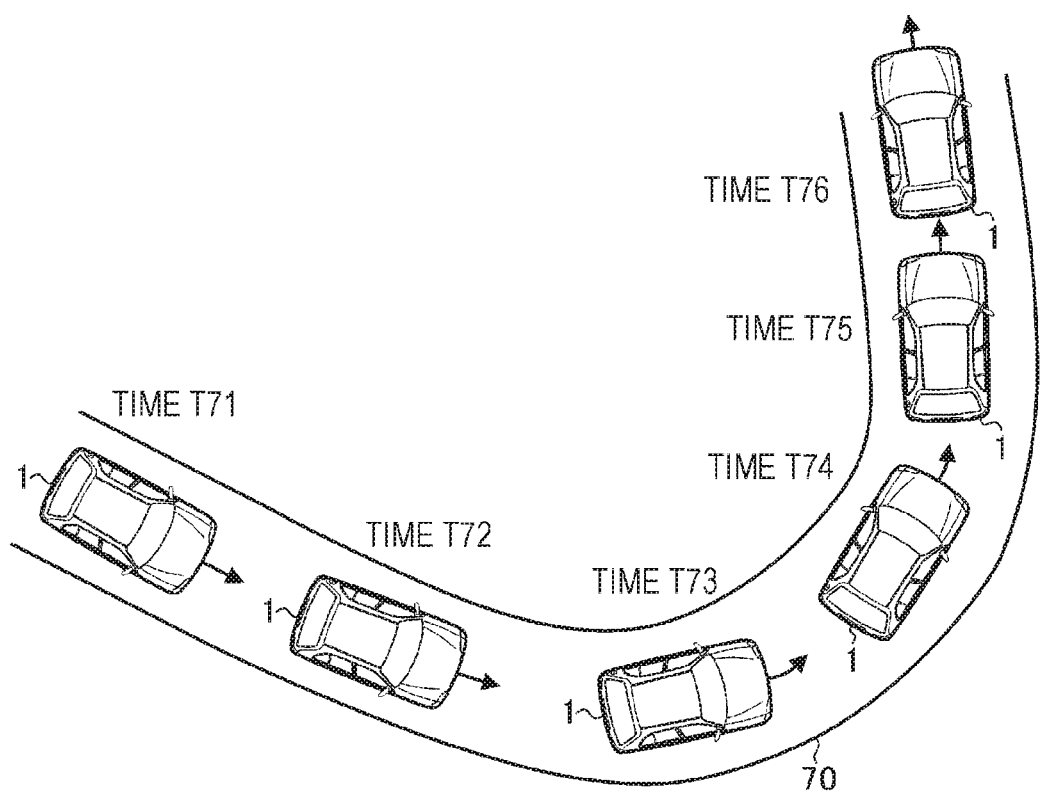
FIG. 9 is a diagram illustrating an example of positions of the vehicle at respective times when the vehicle travels through a curve.
Figure 10:
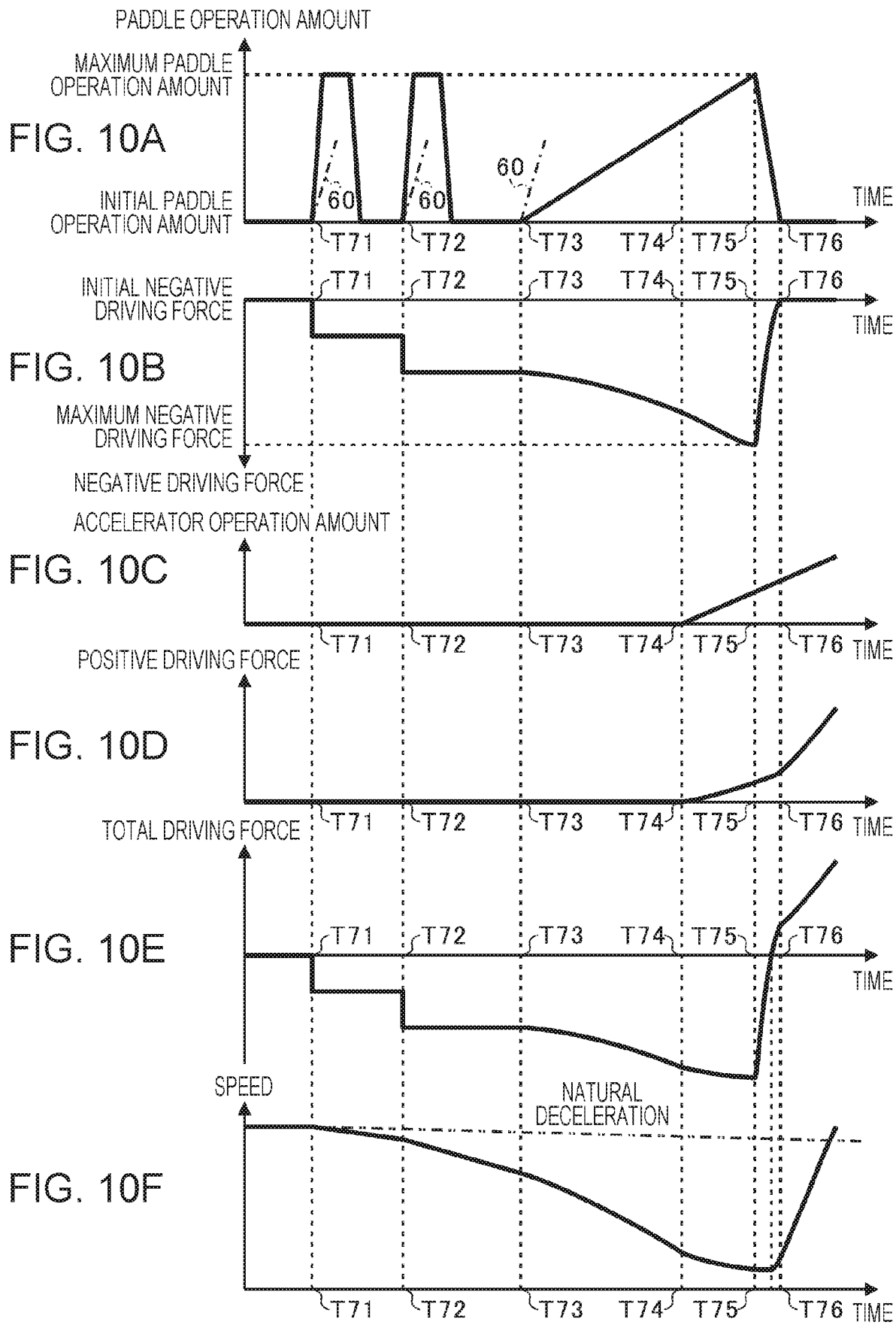

FIG. 9 is a diagram illustrating an example of positions of the vehicle 1 at respective times when the vehicle 1 travels through a curve 70. FIGS. 10A to 10F are diagrams illustrating an example of the operation of the driving force controller 50 in the situation illustrated in FIG. 9. FIG. 10A illustrates how the paddle operation amount varies with time. FIG. 10B illustrates how the negative driving force varies with time. FIG. 10C illustrates how the accelerator operation amount varies with time. FIG. 10D illustrates how the positive driving force varies with time. FIG. 10E illustrates how the total driving force varies with time. FIG. 10F illustrates how the speed of the vehicle 1 varies with time. Time T71 to time T76 in FIG. 9 correspond to time T71 to time T76 in FIGS. 10A to 10F, respectively.

As illustrated in FIG. 9, at the time T71, the vehicle 1 approaches the curve 70. At the time T71, as illustrated in FIG. 10A, the driver quickly pulls the paddle lever 20 once to handle the curve 70. Then, as illustrated in FIG. 10B, the absolute value of the negative driving force is increased in one step.

As illustrated in FIG. 9, at the time T72, the vehicle 1 is to enter the curve 70. At the time T72, as illustrated in FIG. 10A, the driver further quickly pulls the paddle lever 20 once to adjust the speed of the vehicle 1 entering the curve 70. Then, as illustrated in FIG. 10B, the absolute value of the negative driving force is further increased in one step. As a result, the absolute value of the negative driving force is increased in two steps in total.

As illustrated in FIG. 9, at the time T73, the vehicle 1 starts to turn into the curve 70. At the time T73, as illustrated in FIG. 10A, the driver slowly pulls the paddle lever 20 to gradually decrease the speed of the vehicle 1 when turning into the curve 70. Then, as illustrated in FIG. 10B, the absolute value of the negative driving force gradually increases. Accordingly, as illustrated in FIG. 10F, the speed of the vehicle 1 on the curve 70 smoothly changes.

As illustrated in FIG. 9, at the time T74, the vehicle 1 is still on the curve 70. At the time T74, as illustrated in FIG. 10A, the driver slowly pulls the paddle lever 20, and, as illustrated in FIG. 10C, the driver starts to depress the accelerator pedal when the vehicle 1 is to exit the curve 70. Then, as illustrated in FIG. 10E, the amount of decrease in the total driving force gradually becomes smaller. Accordingly, as illustrated in FIG. 10F, the decrease in the speed of the vehicle 1 becomes less steep.

As illustrated in FIG. 9, at the time T75, the vehicle 1 is near the exit of the curve 70. At the time T75, as illustrated in FIG. 10A, the driver relatively quickly returns the paddle lever 20 while, as illustrated in FIG. 10C, increasing the accelerator operation amount. Then, as illustrated in FIG. 10E, the total driving force relatively steeply increases. Then, as illustrated in FIG. 10F, the vehicle 1 changes from deceleration to acceleration at the time when the total driving force changes from negative to positive.

As illustrated in FIG. 9, at the time T76, the vehicle 1 has passed through the exit of the curve 70. At the time T76, as illustrated in FIG. 10A, the driver returns the paddle lever 20 to the initial position while, as illustrated in FIG. 10C, increasing the accelerator operation amount. Then, as illustrated in FIG. 10E, the total driving force increases in accordance with the accelerator operation amount, and, as illustrated in FIG. 10F, the vehicle 1 is accelerated in accordance with the total driving force.

In this way, the driver makes use of the paddle lever 20 and the accelerator pedal 24, thereby achieving dynamic driving of the vehicle 1 such as sports car driving. In addition, the braking operation on the paddle lever 20 makes it easier to achieve dynamic driving of the vehicle 1 than the braking operation on the brake pedal.

Figure 11:
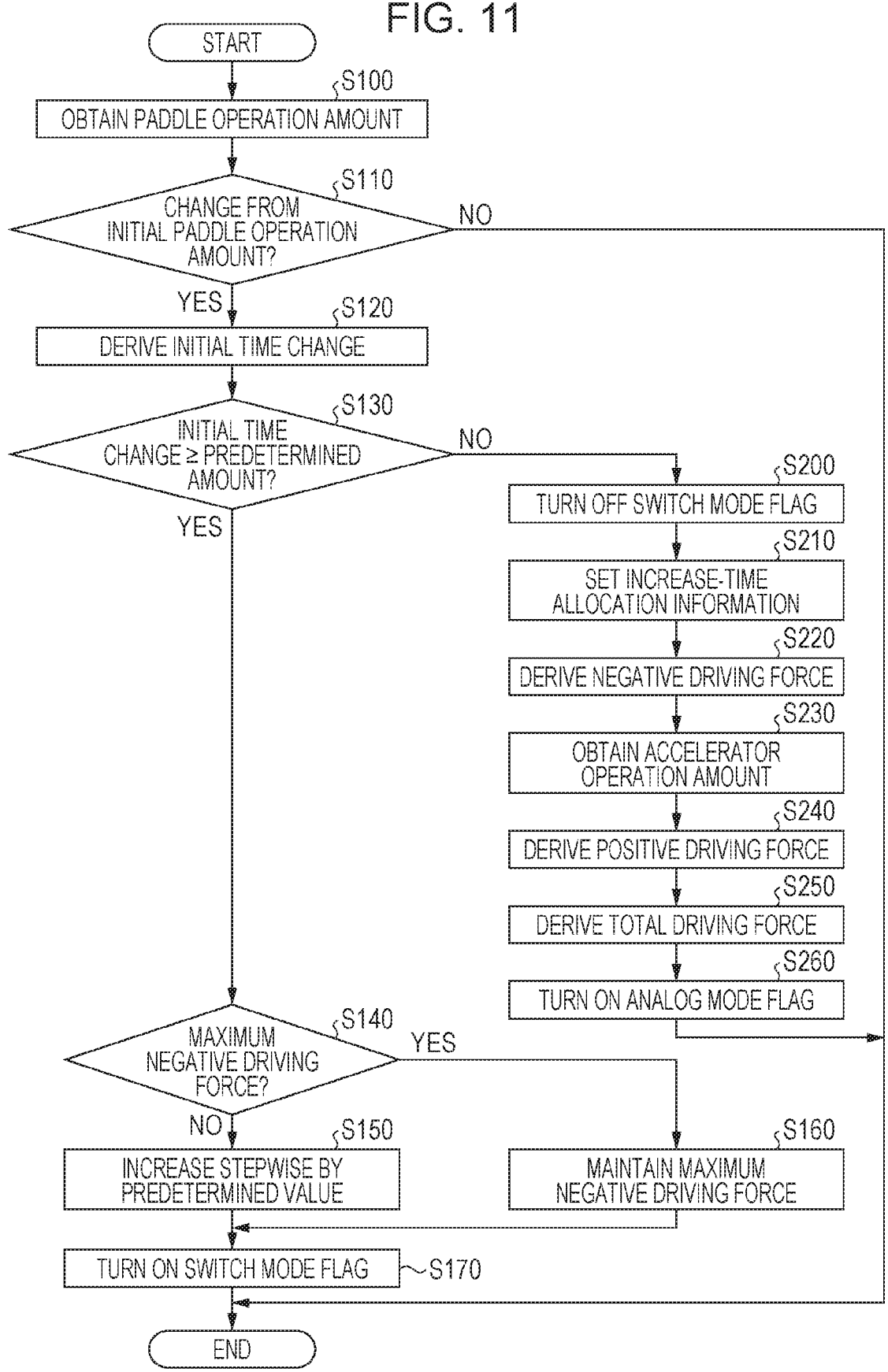
FIG. 11 is a flowchart illustrating the operation of the driving force controller.

FIG. 11 is a flowchart illustrating the operation of the driving force controller 50. The driving force controller 50 repeatedly performs the series of operations illustrated in FIG. to implement interrupt control at intervals of a predetermined control period. At the start timing of the interrupt control, the driving force controller 50 obtains the paddle operation amount from the paddle stroke sensor 22 (S100).

Then, the driving force controller 50 determines whether the paddle operation amount has changed from the initial paddle operation amount (S110). For example, if the previous paddle operation amount is equal to the initial paddle operation amount and the current paddle operation amount is not equal to the initial paddle operation amount, the driving force controller 50 determines that the paddle operation amount has changed from the initial paddle operation amount.

If the paddle operation amount has not changed from the initial paddle operation amount (NO in S110), the driving force controller 50 ends the series of operations. If the paddle operation amount has changed from the initial paddle operation amount (YES in S110), the driving force controller 50 derives the initial time change (S120). For example, the driving force controller 50 subtracts the initial paddle operation amount from the current paddle operation amount to derive the initial time change.

Then, the driving force controller 50 determines whether the initial time change is greater than or equal to a predetermined amount (S130). If the initial time change is greater than or equal to the predetermined amount (YES in S130), the driving force controller 50 sets the control mode to the switch mode and determines whether the current negative driving force is equal to the maximum negative driving force (S140).

If the current negative driving force is not equal to the maximum negative driving force (NO in S140), the driving force controller 50 increases the absolute value of the negative driving force stepwise by a predetermined value from the current negative driving force (S150), and then proceeds to step S170. In this case, the driving force controller 50 causes the motor 10 to drive the wheels 12 with the negative driving force whose absolute value is increased in step S150.

If the current negative driving force is equal to the maximum negative driving force (YES in S140), the driving force controller 50 maintains the negative driving force at the maximum negative driving force (S160), and then proceeds to step S170. In this case, the driving force controller 50 causes the motor 10 to drive the wheels 12 with the maximum negative driving force maintained in step S160.

In step S170, the driving force controller 50 turns on a switch mode flag (S170), and then ends the series of operations. The switch mode flag remains on until the switch mode flag is turned off. As described below, the switch mode flag is used to determine whether to reset the negative driving force whose absolute value is increased stepwise.

If the initial time change is not greater than or equal to the predetermined amount (NO in S130), the driving force controller 50 turns off the switch mode flag (S200). Then, the driving force controller 50 sets the allocation information to the increase-time allocation information that is based on the initial paddle operation amount (S210), since the paddle operation amount is increased from the initial paddle operation amount. Then, the driving force controller 50 applies the current paddle operation amount to the set increase-time allocation information to derive the negative driving force (S220).

Then, the driving force controller 50 obtains the accelerator operation amount from the accelerator pedal sensor 26 (S230). Then, the driving force controller 50 derives the positive driving force based on the accelerator operation amount (S240). For example, the driving force controller 50 derives the positive driving force by using a table or a relational expression in which the accelerator operation amount and the positive driving force are associated with each other.

Then, the driving force controller 50 calculates the sum of the derived negative driving force and positive driving force to derive the total driving force (S250). In this case, the driving force controller 50 causes the motor 10 to drive the wheels 12 with the derived total driving force.

Then, the driving force controller 50 turns on an analog mode flag (S260), and then ends the series of operations. The analog mode flag remains on until the analog mode flag is turned off. As described below, the analog mode flag is used to determine whether the analog mode is continued.

Figure 12:
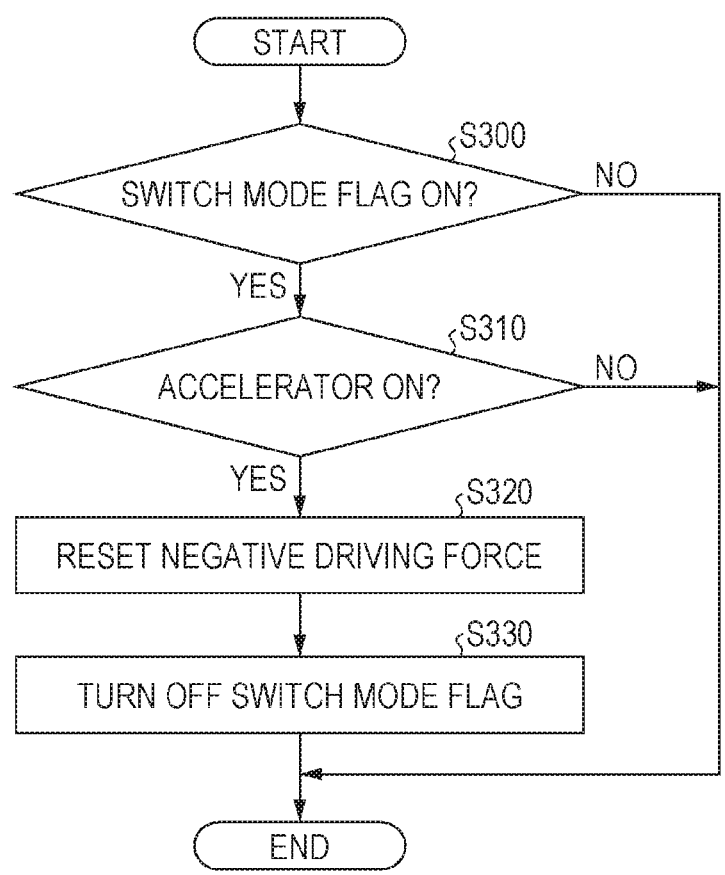
FIG. 12 is a flowchart illustrating an operation related to a switch mode flag.

FIG. 12 is a flowchart illustrating an operation related to the switch mode flag. The driving force controller 50 repeatedly performs the series of operations illustrated in FIG. to implement interrupt control at intervals of a predetermined control period. At the start timing of the interrupt control, the driving force controller 50 determines whether the switch mode flag is on (S300).

If the switch mode flag is not on (NO in S300), the driving force controller 50 ends the series of operations. If the switch mode flag is on (YES in S300), the driving force controller 50 determines whether the accelerator is on (S310). For example, the driving force controller 50 determines that the accelerator is on if the accelerator operation amount is not zero.

If the accelerator is not on (NO in S310), the driving force controller 50 ends the series of operations. In this case, the negative driving force is not reset. If the accelerator is on (YES in S310), the driving force controller 50 resets the negative driving force to the initial negative driving force (zero) (S320). Then, the driving force controller 50 turns off the switch mode flag (S330), and then ends the series of operations.

Figure 13:
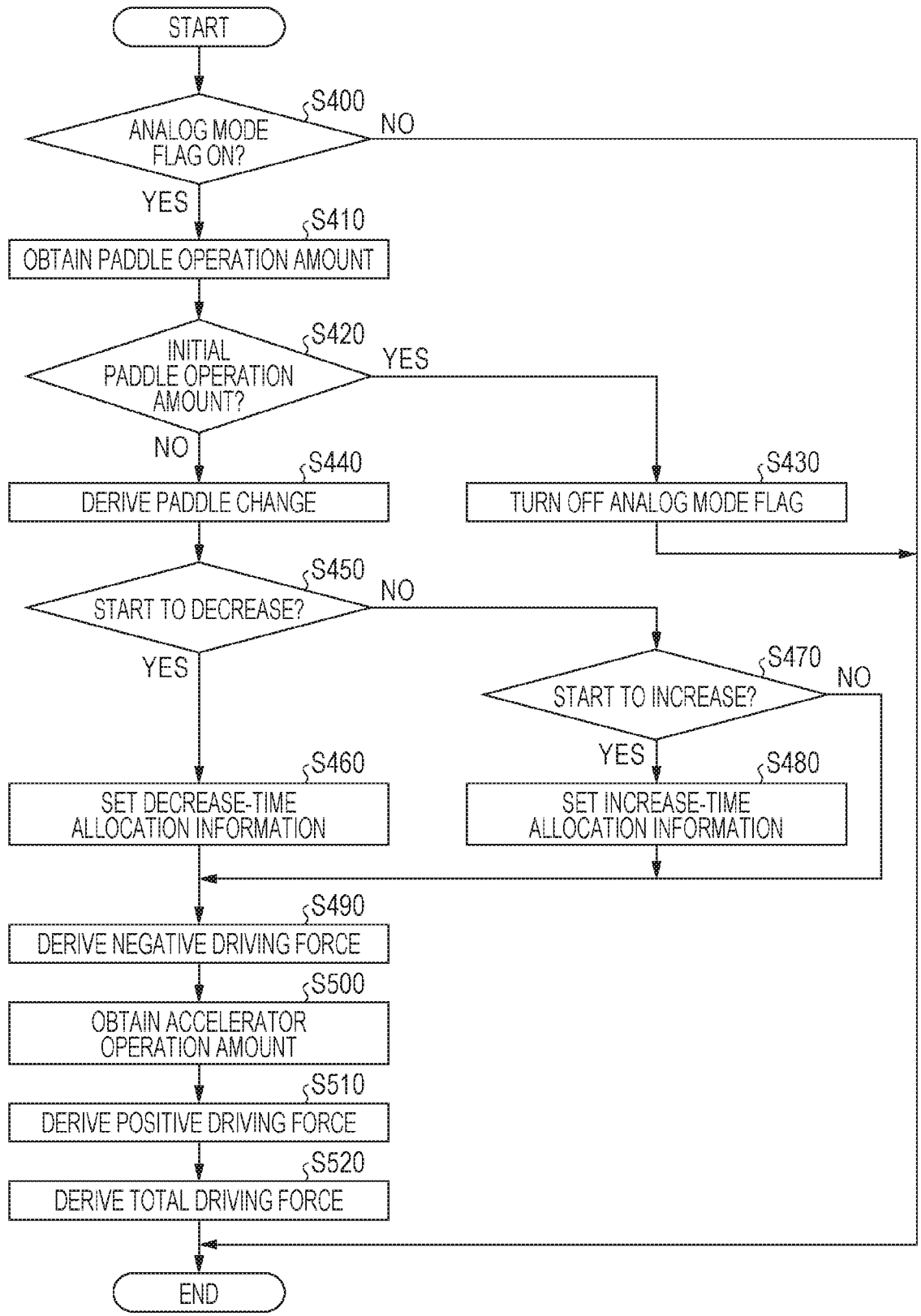
FIG. 13 is a flowchart illustrating an operation related to an analog mode flag.

FIG. 13 is a flowchart illustrating an operation related to the analog mode flag. The driving force controller 50 repeatedly performs the series of operations illustrated in FIG. to implement interrupt control at intervals of a predetermined control period. At the start timing of the interrupt control, the driving force controller 50 determines whether the analog mode flag is on (S400).

If the analog mode flag is not on (NO in S400), the driving force controller 50 ends the series of operations. If the analog mode flag is on (YES in S400), the driving force controller 50 obtains the paddle operation amount from the paddle stroke sensor 22 (S410).

Then, the driving force controller 50 determines whether the paddle operation amount is equal to the initial paddle operation amount (S420). If the paddle operation amount is equal to the initial paddle operation amount (YES in S420), the driving force controller 50 turns off the analog mode flag (S430), and then ends the series of operations. In this case, the analog mode is terminated.

If the paddle operation amount is not equal to the initial paddle operation amount (NO in S420), the driving force controller 50 derives the change in the paddle operation amount with time (referred to as the paddle change) (S440). For example, the driving force controller 50 subtracts the previous paddle operation amount from the current paddle operation amount to derive the paddle change.

Then, the driving force controller 50 determines whether the paddle operation amount has started to decrease (S450). For example, if the previous paddle change has a positive value and the current paddle change has a negative value, the driving force controller 50 determines that the paddle operation amount has started to decrease. If the paddle operation amount has started to decrease (YES in S450), the driving force controller sets the allocation information to the decrease-time allocation information that is based on the paddle operation amount obtained at the time when the paddle operation amount starts to decrease (i.e., the current paddle operation amount) (S460), and then proceeds to step S490.

If the paddle operation amount has not started to decrease (NO in S450), the driving force controller 50 determines whether the paddle operation amount has started to increase (S470). For example, if the previous paddle change has a negative value and the current paddle change has a positive value, the driving force controller 50 determines that the paddle operation amount has started to increase. If the paddle operation amount has started to increase (YES in S470), the driving force controller 50 sets the allocation information to the increase-time allocation information that is based on the paddle operation amount obtained at the time when the paddle operation amount starts to increase (i.e., the current paddle operation amount) (S480), and then proceeds to step S490.

If the paddle operation amount has not started to increase (NO in S470), the driving force controller 50 proceeds to step S490. For example, if both the previous paddle change and the current paddle change have negative values, this indicates that the paddle change continuously decreases. Thus, the previous decrease-time allocation information is maintained. If both the previous paddle change and the current paddle operation amount have positive values, this indicates that the paddle operation amount continuously increases. Thus, the previous increase-time allocation information is maintained.

In step S490, the driving force controller 50 applies the current paddle operation amount to the current allocation information to derive the negative driving force (S490). That is, if the paddle operation amount has started to increase or the paddle operation amount continuously increases, the driving force controller 50 derives the negative driving force by using the increase-time allocation information. If the paddle operation amount has started to decrease or the paddle operation amount continuously decreases, the driving force controller 50 derives the negative driving force by using the decrease-time allocation information.

Then, the driving force controller 50 obtains the current accelerator operation amount from the accelerator pedal sensor (S500). Then, the driving force controller 50 derives the positive driving force based on the accelerator operation amount (S510).

Then, the driving force controller 50 calculates the sum of the derived negative driving force and positive driving force to derive the total driving force (S520), and then ends the series of operations. In this case, the driving force controller 50 causes the motor 10 to drive the wheels 12 with the derived total driving force.

As described above, the driving force controller 50 of the control device 2 of the vehicle 1 according to this embodiment causes the motor 10 to drive the wheels 12 with a negative driving force based on the paddle operation amount (or operation-unit operation amount). If the initial time change is less than a predetermined amount, the driving force controller 50 derives the negative driving force based on the paddle operation amount (or operation-unit operation amount). Accordingly, in the control device 2 of the vehicle 1 according to this embodiment, the negative driving force can be smoothly changed in a curved manner in accordance with the paddle operation amount (or operation-unit operation amount), and the deceleration rate of the vehicle 1 can be smoothly changed.

Therefore, according to the control device 2 of the vehicle 1 and the vehicle 1 according to this embodiment, the vehicle 1 can be decelerated as desired according to the driver's intention.

While an embodiment of the disclosure has been described above with reference to the accompanying drawings, it goes without saying that the disclosure is not limited to this embodiment. It is to be understood that a person skilled in the art can make various changes or modifications within the scope as defined in the appended claims and that such changes or modifications also fall within the technical scope of the disclosure.

For example, in the embodiment described above, the analog mode is set when the initial time change in paddle operation amount is less than a predetermined amount, and the switch mode is set when the initial time change in paddle operation amount is greater than or equal to the predetermined value. Alternatively, the vehicle 1 may be caused to operate in the analog mode, regardless of the initial time change in paddle operation amount.

In the embodiment described above, furthermore, the predetermined amount for the initial time change, on which the determination of the switch mode or the analog mode is based, may be set by learning. For example, first, the driver is caused to depress the brake pedal to decrease the speed of the vehicle 1 to a predetermined speed or less (e.g., 1 km/h or less). In this state, the driver is caused to pull the paddle lever 20 at a speed to be learned for the switch mode, keep the paddle lever 20 in position for a predetermined time period, and then return the paddle lever 20 to the initial position. This operation is repeatedly performed several times. As a result, the driving force controller 50 obtains a plurality of samples of the speed at which the paddle lever 20 is pulled. The driving force controller 50 derives the average of the plurality of samples and sets a predetermined amount for the initial time change on the basis of the derived average. During the learning, if conditions for the depression of the brake pedal and the speed of the vehicle 1 are not met, or if the obtained samples fall out of a predetermined range, the driving force controller 50 may disable the current learning and maintain the previous predetermined amount.

The embodiment described above is not limited to a configuration in which the negative driving force is quickly reset when the accelerator is turned on in the switch mode. Alternatively, the negative driving force may be gradually reset such that the negative driving force can slowly change over time.

In the embodiment described above, furthermore, the paddle lever 20 may be disposed in parallel with the brake pedal or may be disposed in place of the brake pedal. In one embodiment, the paddle lever 20 may serve as "an operation unit".

The vehicle controller 28 (and accordingly driving force controller 50) illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the vehicle controller 28. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A control device for a vehicle including a motor capable of generating a negative driving force for decelerating the vehicle, the control device comprising:
an operation unit;
an operation-unit sensor configured to detect an operation-unit operation amount, the operation-unit operation amount being an amount of operation of the operation unit; and
a driving force controller configured to
cause the motor to drive a wheel of the vehicle with the negative driving force on a basis of the operation-unit operation amount, and
derive the negative driving force in accordance with an initial time change, the initial time change representing an amount of change in the operation-unit operation amount per unit time relative to an operation-unit operation amount at an initial position of the operation unit,
wherein the driving force controller is configured to, when the initial time change is less than a predetermined amount, derive the negative driving force in accordance with the operation-unit operation amount until the operation unit is returned to the initial position.

2. The control device for a vehicle according to claim 1, further comprising
an accelerator pedal sensor configured to detect an accelerator operation amount, the accelerator operation amount being an amount of operation of an accelerator pedal, wherein
the motor is capable of generating a positive driving force for causing the vehicle to travel in accordance with the accelerator operation amount, and
the driving force controller is configured to
cause the motor to drive the wheel with a total driving force, the total driving force being a sum of the negative driving force on the basis of the operation-unit operation amount and the positive driving force on the basis of the accelerator operation amount.

3. The control device for a vehicle according to claim 1, wherein
the driving force controller is configured to
derive the negative driving force in accordance with increase-time allocation information in response to an increase in the operation-unit operation amount, the increase-time allocation information being used to allocate an operation-unit operation amount to a negative driving force such that an operation-unit operation amount between an operation-unit operation amount from which the operation-unit operation amount starts to increase and a maximum operation-unit operation amount obtained when the operation-unit operation amount is maximum is allocated to a negative driving force between a negative driving force obtained when the operation-unit operation amount starts to increase and a maximum negative driving force obtained when an absolute value of the negative driving force is maximum.

4. The control device for a vehicle according to claim 1, wherein
the driving force controller is configured to
derive the negative driving force in accordance with decrease-time allocation information in response to a decrease in the operation-unit operation amount, the decrease-time allocation information being used to allocate an operation-unit operation amount to a negative driving force such that an operation-unit operation amount between an operation-unit operation amount from which the operation-unit operation amount starts to decrease and an operation-unit operation amount obtained when the operation unit is in the initial position is allocated to a negative driving force between a negative driving force obtained when the operation-unit operation amount starts to decrease and a negative driving force obtained when the operation unit is in the initial position.

5. The control device for a vehicle according to claim 1, wherein
the driving force controller is configured to, when the initial time change is greater than or equal to a predetermined amount, increase an absolute value of the negative driving force stepwise by a predetermined value.

6. The control device for a vehicle according to claim 1, wherein
the operation unit comprises a paddle lever disposed near a steering wheel.

7. A vehicle comprising:
an operation unit;

an operation-unit sensor configured to detect an operation-unit operation amount, the operation-unit operation amount being an amount of operation of the operation unit;
a motor capable of generating a negative driving force for decelerating the vehicle; and
a driving force controller configured to
  cause the motor to drive a wheel of the vehicle with the negative driving force on a basis of the operation-unit operation amount, and
  derive the negative driving force in accordance with an initial time change, the initial time change representing an amount of change in the operation-unit operation amount per unit time relative to an operation-unit operation amount at an initial position of the operation unit,
wherein the driving force controller is configured to, when the initial time change is less than a predetermined amount, derive the negative driving force in accordance with the operation-unit operation amount until the operation unit is returned to the initial position.

8. A control device for a vehicle including a motor capable of generating a negative driving force for decelerating the vehicle, the control device comprising:
an operation unit;
a sensor configured to detect an operation-unit operation amount, the operation-unit operation amount being an amount of operation of the operation unit; and
circuitry configured to
  cause the motor to drive a wheel of the vehicle with the negative driving force on a basis of the operation-unit operation amount, and
  derive the negative driving force in accordance with an initial time change, the initial time change representing an amount of change in the operation-unit operation amount per unit time relative to an operation-unit operation amount at an initial position of the operation unit,
wherein the circuitry is configured to, when the initial time change is less than a predetermined amount, derive the negative driving force in accordance with the operation-unit operation amount until the operation unit is returned to the initial position.

9. A vehicle comprising:
an operation unit;
a sensor configured to detect an operation-unit operation amount, the operation-unit operation amount being an amount of operation of the operation unit;
a motor capable of generating a negative driving force for decelerating the vehicle; and
circuitry configured to
  cause the motor to drive a wheels of the vehicle with the negative driving force on a basis of the operation-unit operation amount, and
  derive the negative driving force in accordance with an initial time change, the initial time change representing an amount of change in the operation-unit operation amount per unit time relative to an operation-unit operation amount at an initial position of the operation unit,
wherein the circuitry is configured to, when the initial time change is less than a predetermined amount, derive the negative driving force in accordance with the operation-unit operation amount until the operation unit is returned to the initial position.

* * * * *